May 27, 1958     T. A. RICH     2,836,726
RADIATION SURVEY SYSTEM
Filed Sept. 2, 1954     2 Sheets-Sheet 1

INVENTOR.
THEODORE A. RICH

May 27, 1958   T. A. RICH   2,836,726
RADIATION SURVEY SYSTEM
Filed Sept. 2, 1954   2 Sheets-Sheet 2
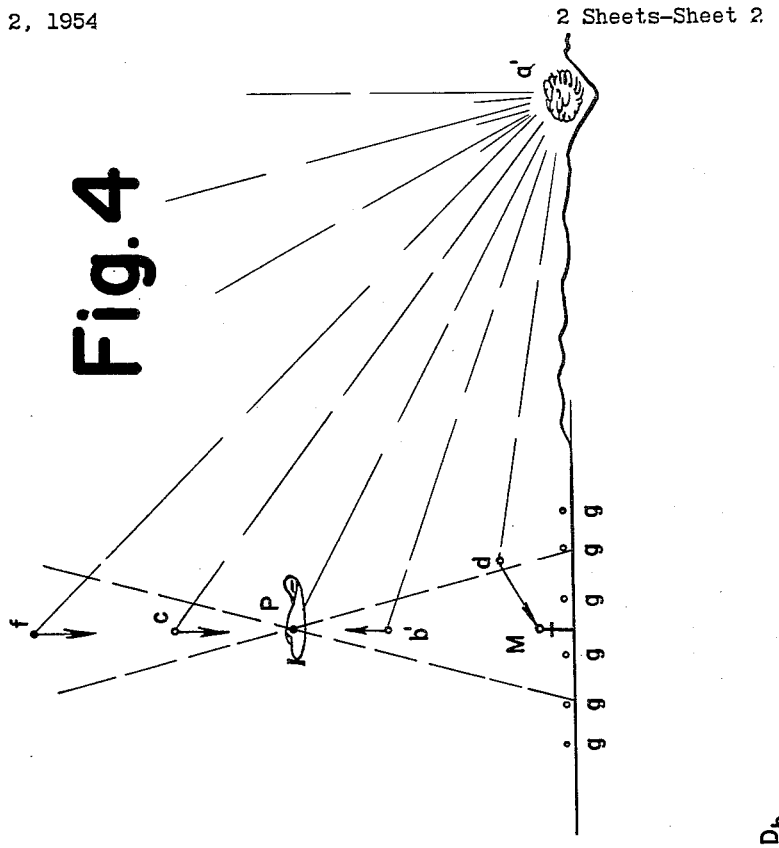
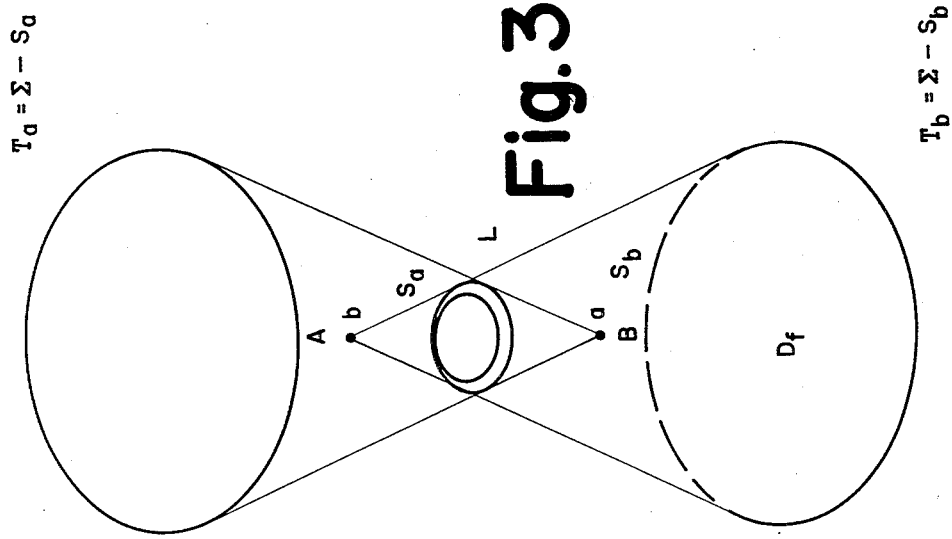
$T_a = \Sigma - S_a$
$T_b = \Sigma - S_b - D_b$
INVENTOR.
THEODORE A. RICH
BY
ATTORNEYS 2,836,726
Patented May 27, 1958

2,836,726

RADIATION SURVEY SYSTEM

Theodore A. Rich, Schenectady, N. Y., assignor, by mesne assignments, to the United States of America as represented by the Secretary of the Navy Application September 2, 1954, Serial No. 453,978

5 Claims. (Cl. 250—83.6)

This invention is concerned with the art of detecting and measuring the amount of contamination on the ground due to radioactivity induced in the ground or radioactive material deposited on the ground due to an atomic explosion.

In the past, the systems used for this purpose have had an inherent source of error in that they could not eliminate the effect of scattered energy originating from a distant source. In an atomic explosion at or near ground level there is a crater left which is highly radioactive, primarily due to neutron bombardment. The extent of this induced activity is limited by the effective range of the neutrons which is 2000 feet or less. At the instant of the explosion the debris which is within this range plus fragments of the bomb proper are highly radioactive and are hurled into the air to be carried by the wind and ultimately settle out on the ground. The extent and magnitude of this airborne contamination depends upon many variables and it is important to measure this quickly and accurately. Because of the possibly great area, the survey can only be made quickly enough to be of value by an airborne equipment.

Such a system as developed by me is useful in determining the suitability for occupation by personnel and equipment of a ground area after an atomic explosion and affords a simple, safe means which can carry out a survey for this purpose.

Therefore, it is an object of this invention to provide a system of measuring and detecting ground radiation in a limited area.

It is a further object of this invention to provide an airborne radiation detecting and measuring system which can be used to present an accurate indication of the amount of ground radioactivity over a large area.

It is a still further object of this invention to provide an airborne radiation detecting and measuring system which will correct the indicated radiation so that the radiation in the air between the aircraft carrying the system and the ground will not be counted and the final indication will represent, fairly accurately, only the radiation from radioactive material on the ground.

Another object of this invention is to provide a simple construction for the measuring of only ground radiation and correcting the total measured radiation to eliminate the undesired indication of airborne radiation.

Other objects and many of the attendant advantages of this invention will be readily appreciated as the same becomes better understood by reference to the following description when considered in connection with the accompanying drawing wherein:

Figure 3 is a diagram of the geometry of the detecting system.

Figure 4 is a sketch illustrating the principle of the invention.

Figure 1:
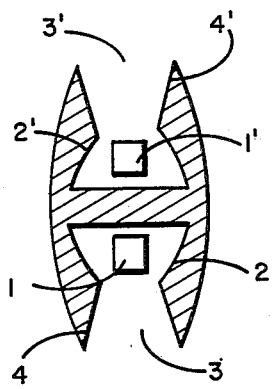
Figure 1 is a schematic representation of the structure of the detecting means.

The problem is to measure the contamination (on or near the ground that a man on foot would experience) from an airplane flying at an altitude of from 500 to 2000 feet. An analogy may show the problem clearly. Figure 4 represents the profile of the terrain assumed, with a crater at $a'$ due to an explosion and the source of radioactivity is by analogy a very powerful light. The man is at M and is shielded from any direct rays from the lamp at $a'$. Scattered on the ground are many feeble lights $g$. The light that reaches the man is (1) the light from the distributed feeble lamps $g$ and (2) light from the powerful source $a'$ that has been scattered such as the ray $a'$—$d$—$m$. Dropping the analogy for the moment, radiation from either the radioactive particles, such as $g$ or scattered radiation from $a'$ are harmful but the particles may be picked up on clothing or ingested by stirring up dust and thus constitute a special hazard that this equipment is designed to evaluate.

Going back to the analogy again, the man in the airplane can see the lights $g$ and directly the source $a'$. By using a telescope or by looking through a cone, he could cut out all direct rays from $a'$ and look only at a particular area on the ground and count the number of feeble lamps $g$, but he would be troubled in doing this if at $b'$ a light ray from $a'$ were reflected into his eye for it would appear to be another source of light such as one of the $g$'s. The scheme here would be to look up from the airplane with the same cone and count the number of apparent sources such as $c$. For a first approximation it could be assumed that the number of $c$ types of reflection would be equal to the number such as $b'$ and so by subtracting the counts obtained by looking up from those obtained by looking down he will get the number of $g$'s on the ground.

The objection to this technique is that reflections could occur in a much greater volume of space when looking up than when looking down, such as ray $f$. This is true, of course, but the contribution such as $f$ is reduced rapidly as the distance from the plane increases. The original beam at $f$ is more highly attenuated. The reflected beam has farther to go and it will be attenuated and also the angle of reflection that will send light to the observer in the plane is more critical.

The analogy of light to gamma rays is reasonably good. The gamma rays travel in straight lines (as do the light rays) until they hit something. In terms of the analogy the "visibility" of air to gamma rays corresponds to an optical visibility of a few thousand feet.

Drawing attention to Figure 3, there is shown at point $b$ an ion chamber which will respond to all radiation, represented by $\Sigma$, except that in a cone B defined as follows: The apex of the cone is point $b$ and its sides are defined by lines passing through this apex and tangent to the periphery of a lead shield L interposed between the ion chamber $b$ and the ground. The radioactivity originating in this cone includes all the ground radiation $D_b$ and all the radiation $S_b$ produced in the air by scattering. Thus the radiation detected at $b$ may be represented by $T_b$ and expressed mathematically as follows:

$$T_b = \Sigma - S_b - D_b$$

Also in Figure 3 the point $a$ represents the position of another ion chamber which will respond to all radiation $\Sigma$ except that in the cone A defined by its apex $a$ and lines passing through $a$ and tangent to the periphery of the lead shield L. The radioactivity $S_a$ in this cone is due to scattering. As above the radiation detected at $a$ may be represented by $Ta$ and expressed mathematically as follows:

$$Ta = \Sigma - Sa$$

If this detecting system were airborne and were at such a height that the distance to the ground is large in comparison to the mean free path of the particle involved, then assuming that the air radiation is uniform and the same in all directions, an assumption which is a fair approximation, then the air radiation in cones A and B will be equal, therefore:

$$Sb = Sa$$

and if the output of the ion chamber at $b$ were subtracted from the output of that at $a$ as follows:

$$Ta - T_b = \Sigma - S_b - (\Sigma - S_b - D_b) = D_b$$

or only ground radiation.

It is seen that a measurement of the ground radiation in the area of the base of cone B will result.

Since this is one of the desired objectives of the invention, it is seen that simple method has been provided to correct for this undesired radiation when a ground radiation measuring system is desired.

Figure 2:
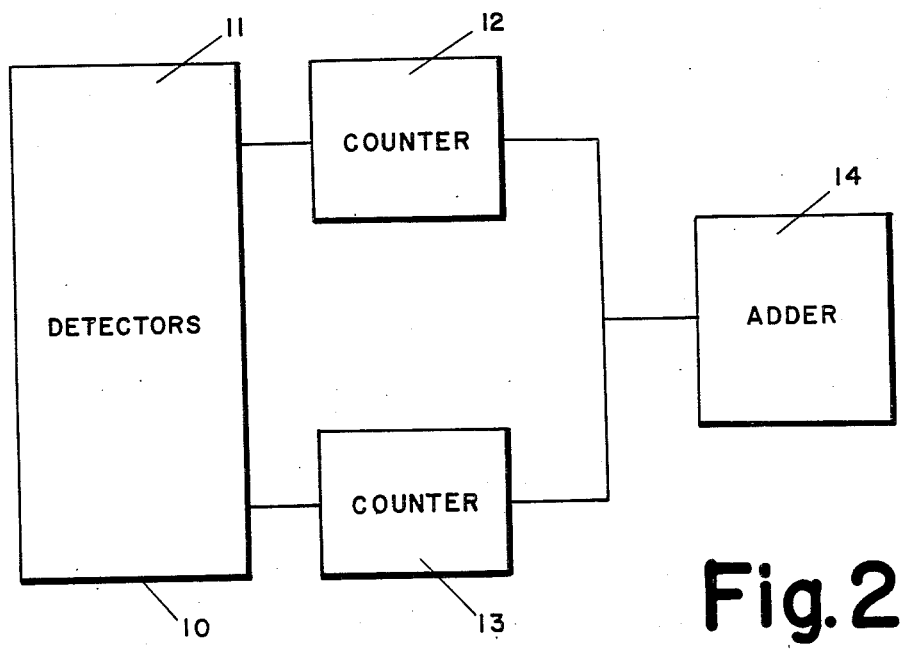
Figure 2 is a schematic representation of the entire system for detecting and measuring the radioactivity.

In Figures 1 and 2 there is illustrated a specific device embodying the principle explained above. This specific device while differing slightly from the above principle nevertheless follows logically and is at the same time simpler to construct and use.

Figure 1 illustrates schematically the construction of a detector means for accomplishing the detection phase of the radiation survey system. This detector means comprises an ion chamber or other suitable radiation detector 1. A shield 2 formed from lead or any other suitable shielding means partially surrounds the detector, except for an opening 3 which would be open from the aircraft carrying this device toward the ground. Because of the shape of the shield, the detector 1 will respond only to radiation in a cone whose upper surface may be defined by the surface of the flared portion 4 of the shield 2. The radiation in this cone will consist of that due to radioactive material on the ground and that in air bounded by the limits of the cone.

Mounted above the detector 1 is a second detector 1' and shield 2' with an upwardly directed opening 3' and flared portion 4'. The second detector will indicate radiation in a conical volume as will the first detector except that the second cone will open upwardly. The radiation indicated by this detector will be due to the scattering in a second cone of comparable volume to the first cone.

If, as before, the detectors are high enough, the scattered radiation on one cone will be equal to that in the other. Then if the output of second detector 1' is subtracted from that of the first 1, the remainder will equal a measurement of only ground radioactivity as before.

A schematic illustration of the entire survey system is shown in Figure 2. The detector means 10 comprises a support housing 11 which carries the ion chambers and shields shown in Figure 1. There may be mounted by any suitable means and this does not comprise a part of my invention. Two counting means 12 and 13 receive the output of each detector and record its amount. The output of each counter is then fed to an adder 14 which adds the output of the counters in a bucking sense, that is to say, it subtracts the output of counter 12 from that of counter 13 so that the remainder is a measurement of the radiation due to radioactive material on the ground.

The particular detectors, counters and adder which can be used in my radiation survey system may be those which are well known in the art and are commercially available. These specific means do not constitute a part of my invention.

It is seen that I have provided a simple device to make a first order correction to a radiation survey system whereby an accurate indication of ground radiation may be rapidly obtained.

Obviously many modifications and variations of the present invention are possible in the light of the above teachings. It is therefore to be understood that within the scope of the appended claims the invention may be practiced otherwise than as specifically described.

What is claimed is:

1. An airborne ground radiation measuring device comprising, a support means, a first radiation detector mounted in said support means, a second radiation detector mounted in said support means above said first detector, a first shield surrounding said first detector, a conical opening in said first shield directed upwardly away from the ground, a second shield surrounding said second detector, a second conical opening in said second shield similar to said first opening but directed downwardly toward the ground, the first detector registering the radiation in the upper region extending from the conical opening and the second detector registering the radiation in the lower region extending from the second conical opening and the direct radiation from the ground.

2. An airborne ground radiation measuring device as defined in claim 1 wherein said device includes a counting means associated with each detector, means for subtracting the output of the counting means associated with the first detector from the output of the counting means associated with the second detector so that the result will be an indication of the ground radiation in a limited area.

3. An airborne radiation survey system for measuring radioactivity of predetermined areas on the ground, said system comprising; a pair of ion chambers, shielding means located between one of said chambers, and the ground so that said one chamber will detect all radiation except that emanating from a volume defined by a first cone whose apex is said one chamber and whose sides are determined by lines passing through the apex and touching the periphery of said shielding means and the ground, second shielding means mounted above the other chamber whereby said other chamber will detect all radiation except that emanating from a volume defined by a second cone whose apex is said other chamber and whose sides are defined by line passing through said apex and touching the periphery of said second shielding means, one cone opening in a direction opposite than that in which the other opens and the small ends thereof overlapping each other; means for measuring the radioactivity detected by the chambers and adding the measured quantities in a bucking sense with the final result representing the radiation from the radioactivity material on the ground within the area of the base of said first cone.

4. An airborne radiation measuring device comprising; a first radiation detector, shielding means surrounding said detector, an opening in said shielding means directed toward the ground, a second radiation detector, second shielding means surrounding said second detector, an opening in said second shielding means directed away from the ground, said first detector detecting the radiation from a radiating source reflected within the opening extended into space and the radiation from the ground covered by the opening extended, the second detector detecting the radiation from the radiating source reflected within the second opening extended into space.

5. The device of claim 4, further including means for recording the output of each detector and for subtracting the output of said first detector from said second detector thereby obtaining a resultant reading equivalent to the radiation from the localized area on the ground only.

References Cited in the file of this patent

UNITED STATES PATENTS

| | | |
|---|---|---|
| 2,535,066 | Herzog | Dec. 26, 1950 |
| 2,562,968 | Teichmann et al. | Aug. 7, 1951 |
| 2,562,929 | Lord, et al. | Aug. 7, 1951 |